Jan. 10, 1961 W. STONE, JR 2,967,458
INSTRUMENT FOR USE BY A SURGEON IN VIEWING
THE FIELD OF OPERATION UNDER MAGNIFICATION
Filed May 16, 1957 7 Sheets-Sheet 1

INVENTOR.
William Stone Jr.
BY
Abbot Spear
ATTORNEY

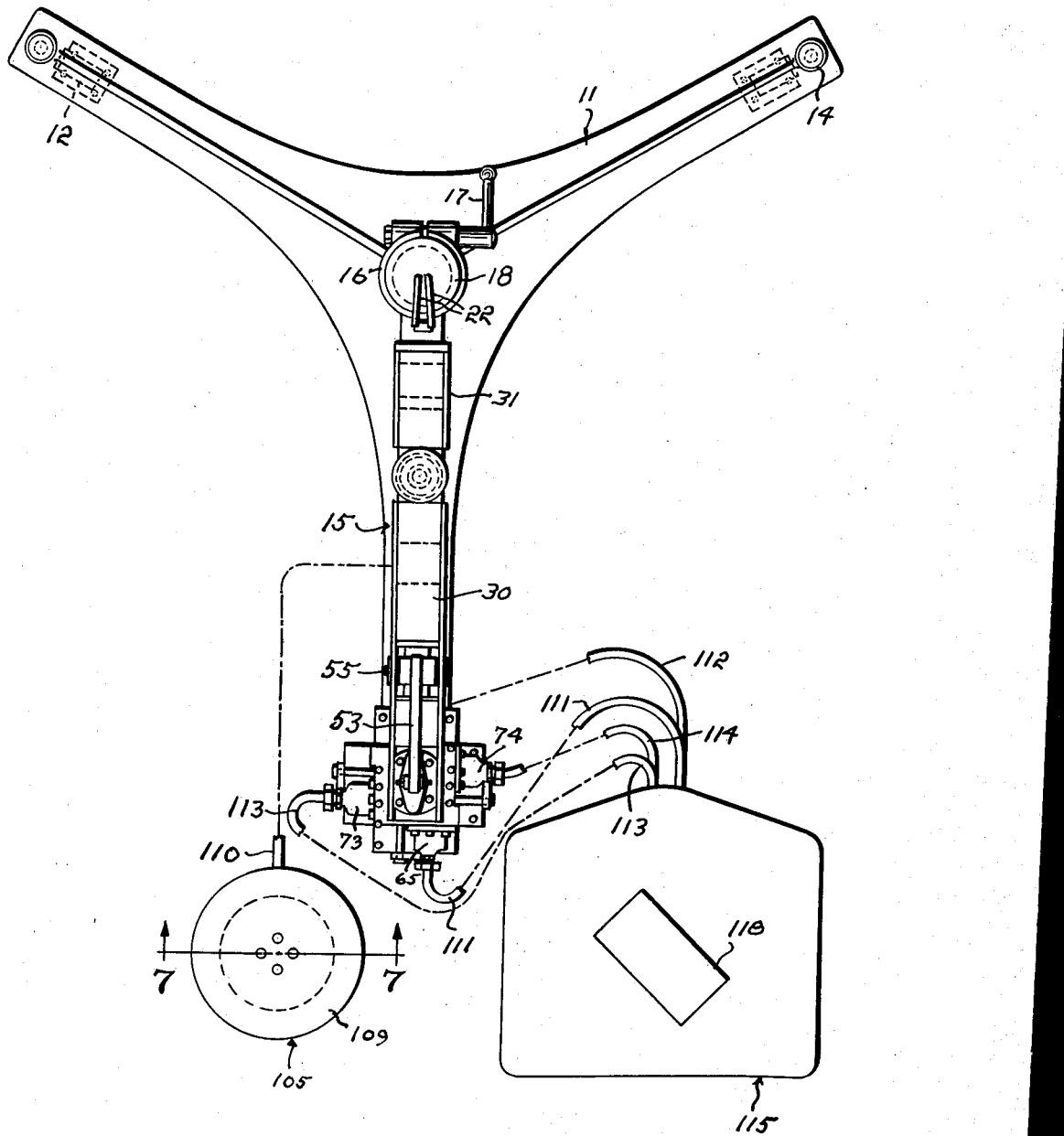

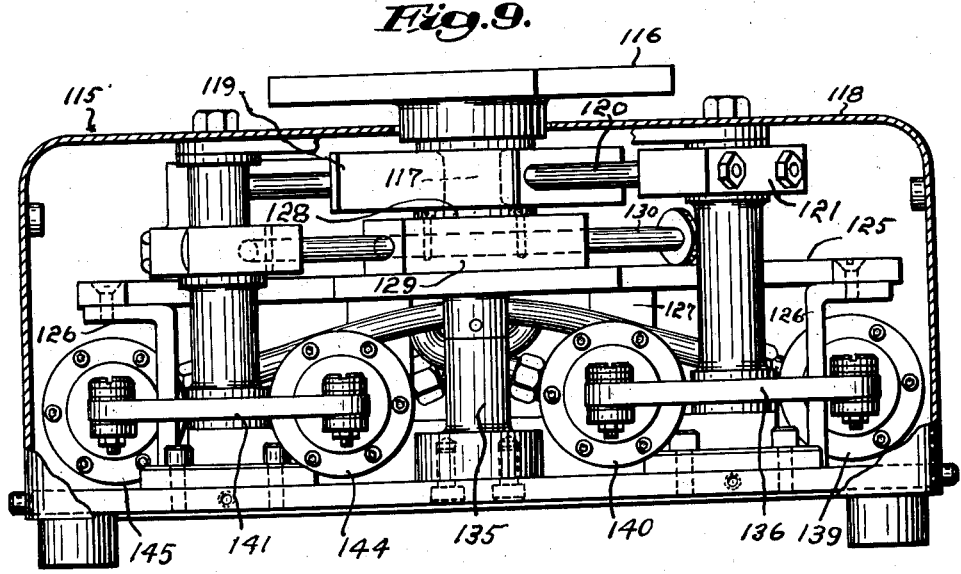
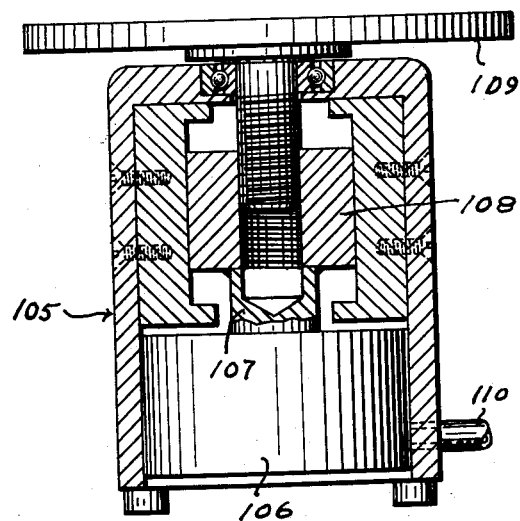

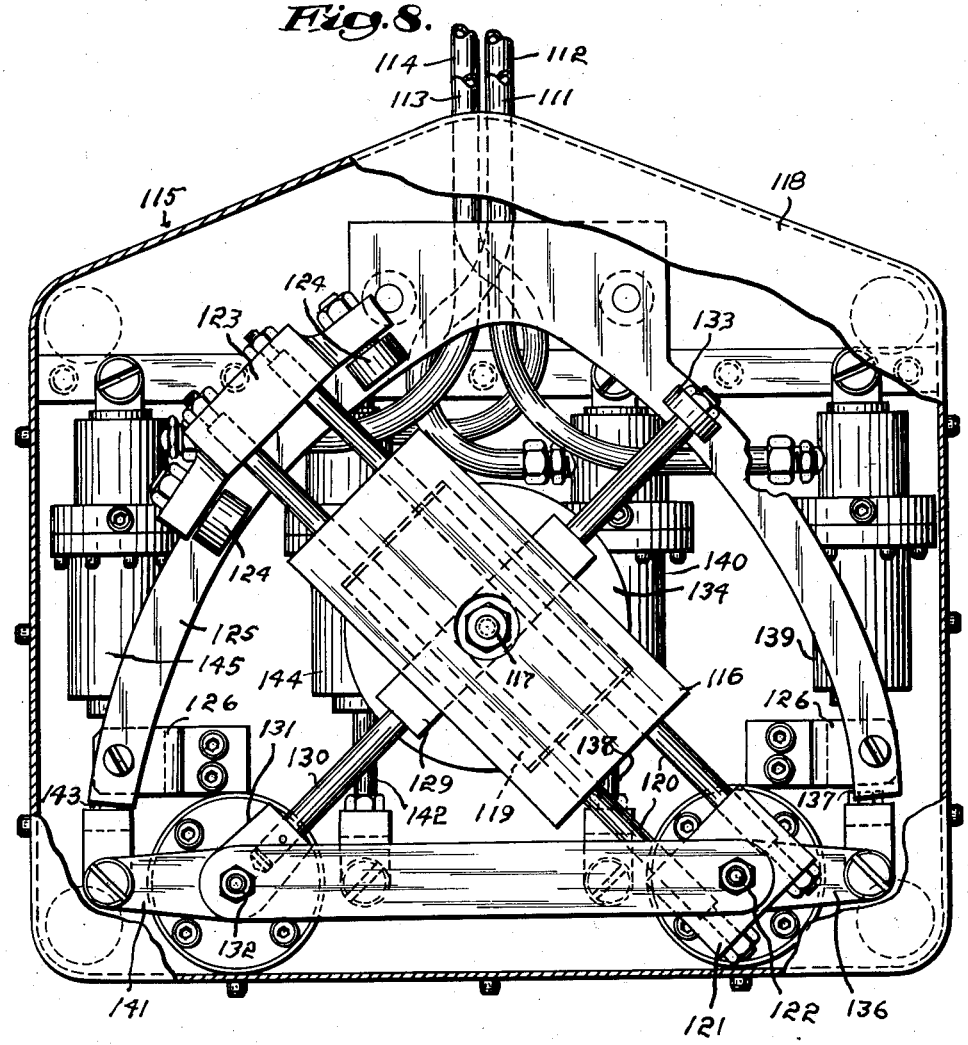

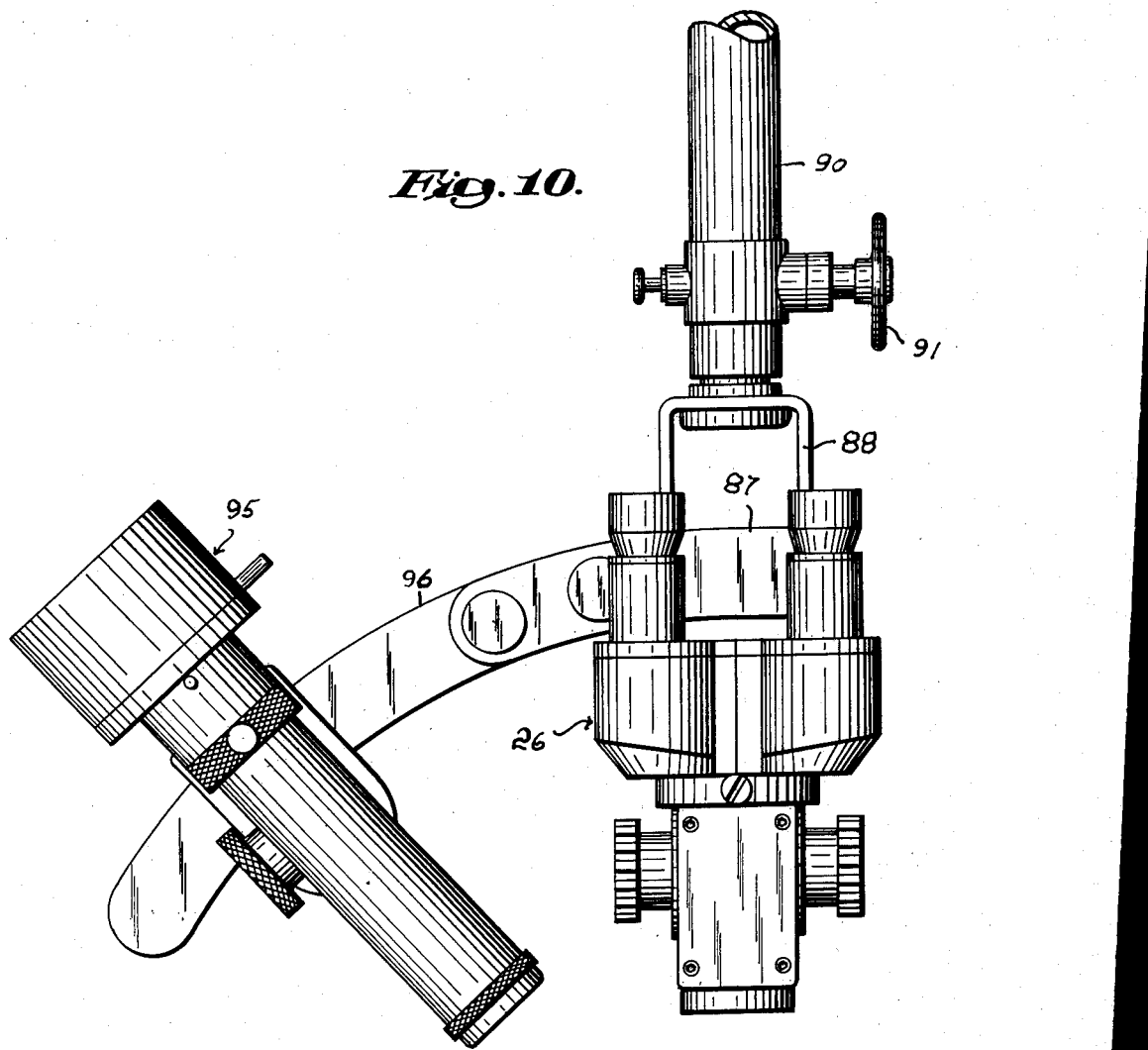

United States Patent Office 2,967,458
Patented Jan. 10, 1961

2,967,458

INSTRUMENT FOR USE BY A SURGEON IN VIEWING THE FIELD OF OPERATION UNDER MAGNIFICATION

William Stone, Jr., 243 Charles St., Boston, Mass.

Filed May 16, 1957, Ser. No. 659,684

5 Claims. (Cl. 88—39)

The present invention relates to an instrument for use in eye and other surgery where it is advantageous for the surgeon to have the field of the operation suitably magnified and sharply in focus at all times.

In various eye operations, magnification and illumination of the field are necessary to enable a required standard of precision to be attained. As an example of such an operation, reference is made to the division of the cornea into exterior and interior layers to enable an artificial cornea to be inserted therebetween. Such a cornea is shown in Letters Patent No. 2,714,721 in which procedures and requirements are more completely set forth, but it will be readily appreciated that in order for such corneal layers to be accurately established, the use of a binocular magnifier is dictated provided that the surgeon can vary its focal point at will as the operation progresses, not only in any direction in a plane, but also vertically with respect thereto. Such changes in the focal point must be done by the surgeon himself, but this is difficult because his hands are sterile and are both involved in the delicate surgery.

The principal objectives of the invention are to provide an instrument including a binocular magnifier with which there is usually adjustably associated a lamp, and means enabling the magnifier to be moved, not only in any direction in a plane, but also vertically, with respect thereto and to enable these changes to be made quickly and accurately by foot movements of the surgeon. The lamp is preferably a slit lamp to facilitate visualizing depths.

These objectives are attained, in accordance with the invention, by providing an instrument including a standard on which there is mounted, for vertical adjustment, a support to which a control unit is connected by means operable to move it vertically relative thereto. The control unit carries a binocular magnifier and there are actuating means operable to move it in any direction in a substantially horizontal plane. The actuating means for moving the unit and the magnifier are hydraulic and are preferably arranged so that one of the surgeon's feet may be utilized for effecting horizontal adjustments of the magnifier and the other for effecting its vertical adjustment.

It will be appreciated that any and all movements that are to be effected by the surgeon are necessarily small and represent appreciable movements of the surgeon's foot, and the present invention provides for a suitable ratio of movements in hydraulic connections enabling delicate adjustments of the focal point of the magnifier to be accurately made by the surgeon's foot so that an operation may progress without the necessity of the surgeon removing his eyes from the eye piece.

In the accompanying drawings there is shown an illustrative embodiment of an instrument, in accordance with the invention, from which these and other of its objectives, novel features and advantages will be readily apparent:

In the drawings:

Fig. 6 is a top plan view of the instrument;

Fig. 7 is a section taken approximately along the indicated lines 7—7 of Fig. 6;

Fig. 8 is a plan view of the foot control disposed on the right hand side of the instrument as viewed in Fig. 6 with part of its cover broken away;

Fig. 9 is an edge view of the control of Fig. 8 with part of the cover removed; and Fig. 10 is a fragmentary perspective of the binocular magnifier and the associated lamp.

Figure 1:
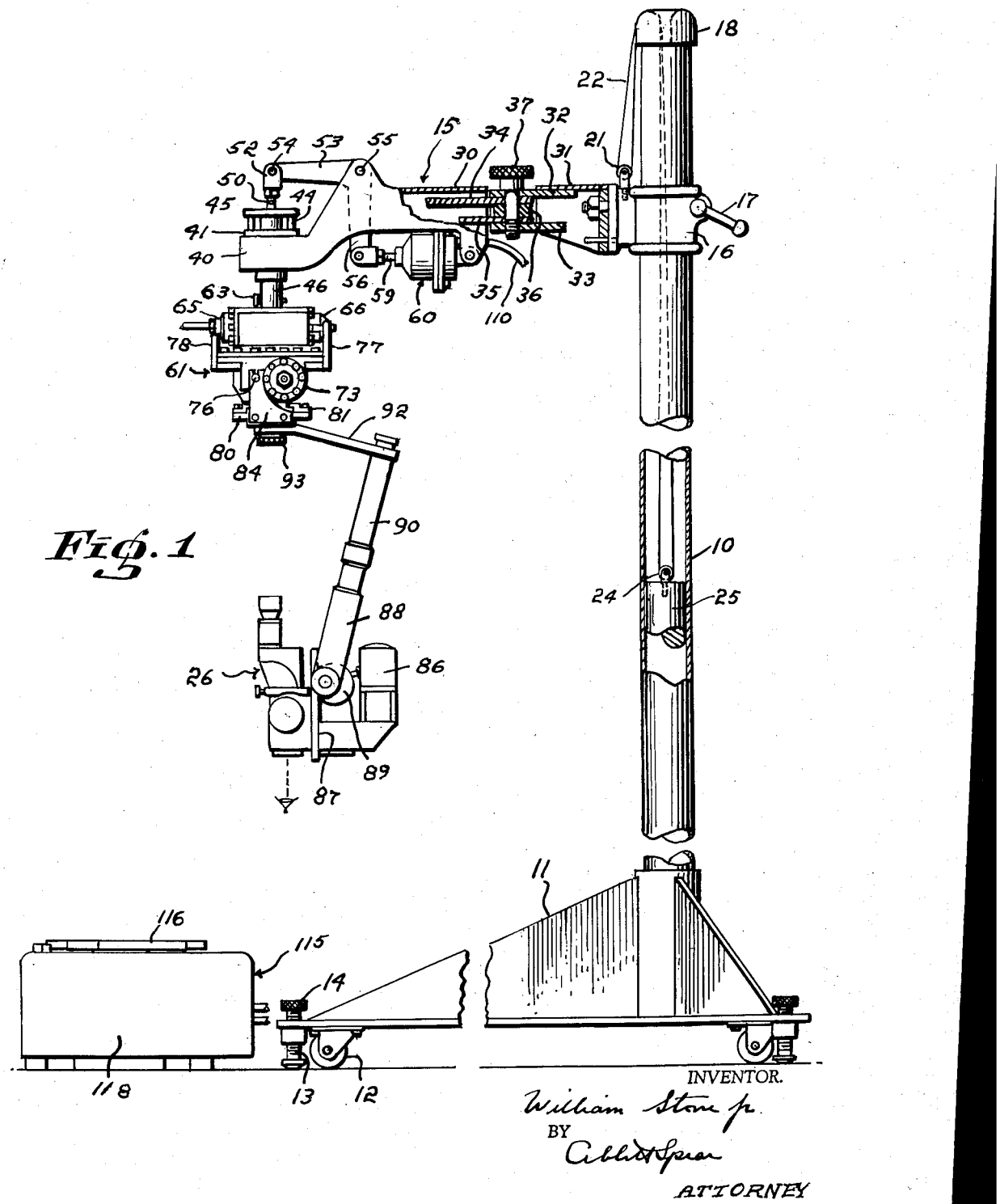
Fig. 1 is a side elevation of an instrument in accordance with the invention partly broken away and partly sectioned.
Figure 2:
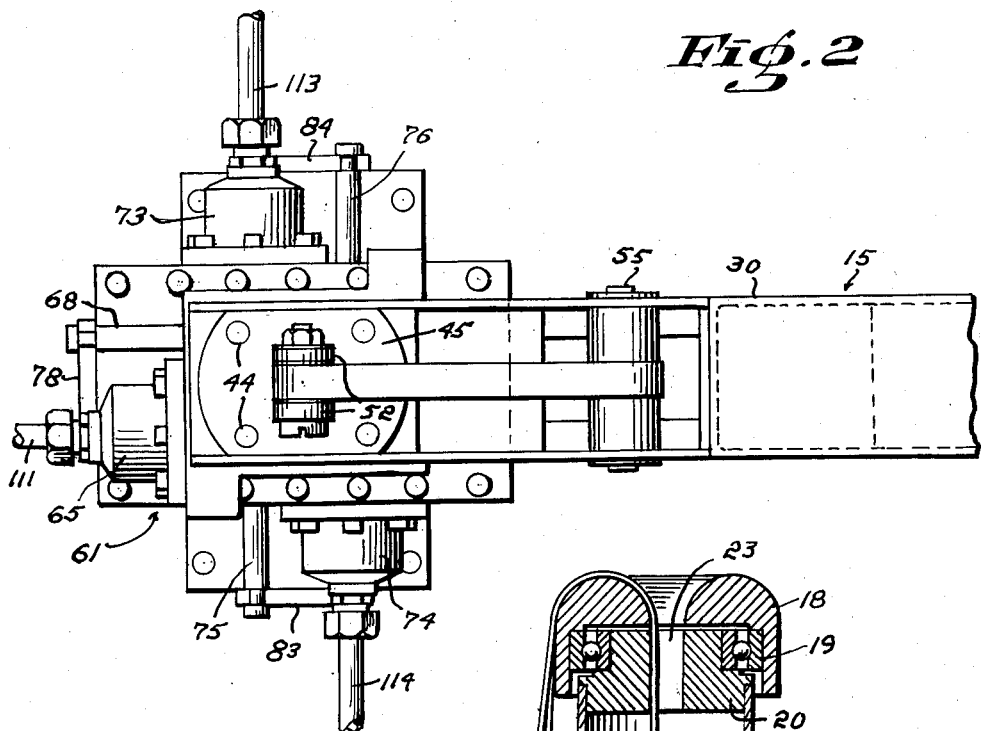
Fig. 2 is a fragmentary top plan view of the support on a substantially increased scale.

The instrument shown in the drawing has a tubular standard 10 mounted on a base 11 provided with casters 12 and threaded locks 13 provided with knurled heads 14 enabling the locks to be readily turned to bring them into or out of frictional locking engagement with the floor. See Figs. 1 and 6.

The instrument has a generally indicated support 15 provided with a split collar 16 vertically slidable with respect to the standard 10 when the threaded lock, whose handle is indicated at 17, is released.

Figure 3:
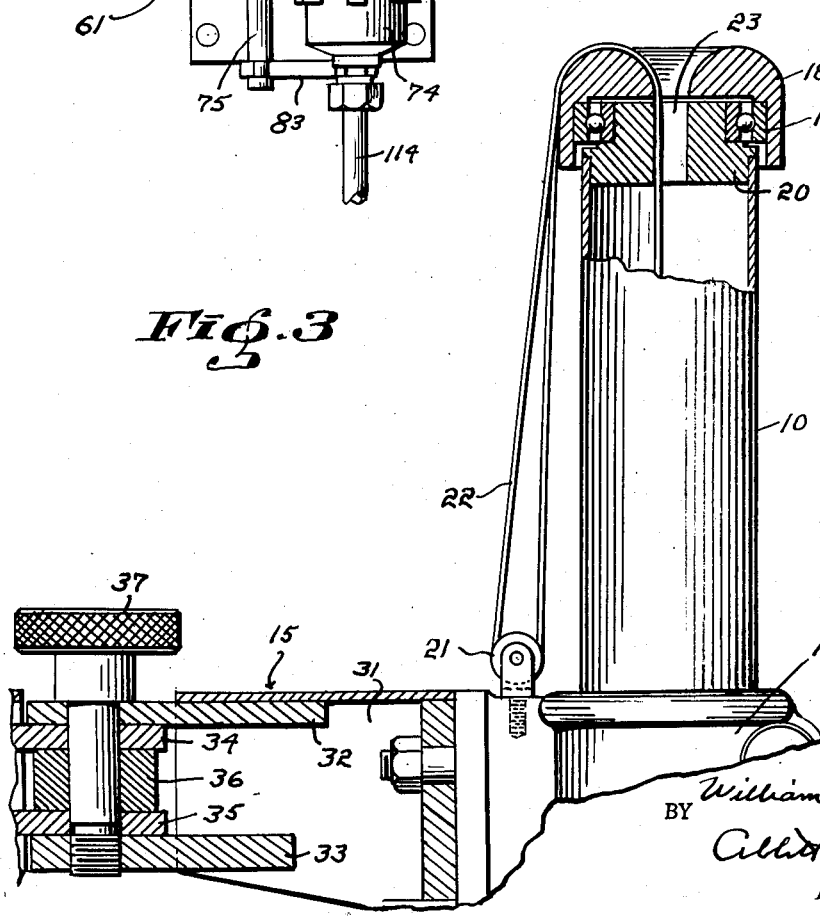
Fig. 3 is a fragmentary and partly sectioned side view illustrating the connection between the support and the standard.

As will be readily apparent from Fig. 3, an annular cap 18 is rotatably supported on the upper end of the standard 10 by a ball bearing unit 19 interposed between the cap 18 and an annular bearing mount 20 secured in the upper end of the standard 10. The collar 16 carries a pulley 21 about which is trained the supporting cable 22 extending downwardly into the standard 10 through the axial passageway 23 defined by the cap 18 and the mount 20 and is there trained around a pulley 24 on the counter weight 25 which is vertically slidable within the standard 10. By these means, the support 15 may be readily raised and lowered as well as swung relative to the standard 10 to bring the binocular magnifier, generally indicated at 26, approximately into a selected position for use.

The support 15 includes an arm 30 and a bracket 31. The bracket 31 is provided, as may be seen in Figs. 1, 3 and 4, with vertically spaced plates 32 and 33, receiving between them spaced plates 34 and 35 carried by the arm 30 and there is a spacer 36 between the plates 34 and 35. A pivot 37 extends through the several plates and through the spacer and is threaded into the plate 33 thus to provide means enabling the arm 30 to be swung relative to the bracket 31 or locked in any selected position relative thereto.

At its front end, the arm 30 is formed with a mount 40 having a vertical bore receiving a flanged bushing housing 41. See Fig. 4. The flange of the bushing mounting 41 and the mount 40 have vertically alined bores 42 and 43, respectively, to slidably receive depending pins 44 carried by a cap 45. The cap 45 is secured to the upper end of an actuating sleeve 46 extending downwardly through the bushing housing 41 in which there are suitable bushings 47 ensuring the free vertical movement of the sleeve 46 relative to the support 30.

Lodged in the upper part of the sleeve 46 is a seat 48 engaged by the ball shaped head 49 of the connecting rod 50. A centrally apertured retaining plug 51 is threaded in the upper end of the sleeve 46 to engage with the upper surfaces of the head 49 to complete a universal joint between the sleeve 46 and the connecting rod 50.

Attached to the upper end of the connecting rod 50 is a fork 52 straddling the arm 53 and connected thereto by suitable pivot means 54. The arm 53 is part of a bell crank lever pivoted to the support 30 as at 55 with its other arm 56 extending downwardly and pivotally joined as at 57 to a fork 58. The fork 58 is carried by the piston rod 59 of the generally indicated pressure responsive device 60 attached to the under surface of the support arm 30. It will be apparent that movement of the piston rod 59 in one direction or the other will be attended by the vertical movement in one direction or another of the sleeve 46.

Figure 4:
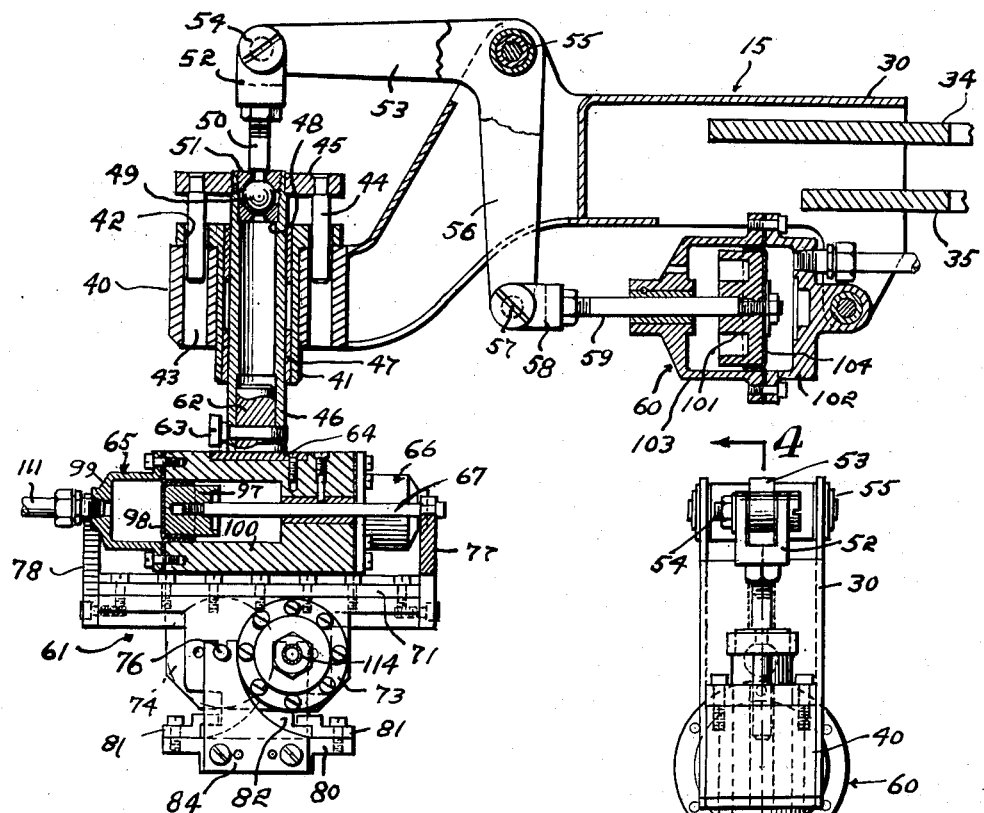
Fig. 4 is a fragmentary section of the support and the control unit taken approximately along the indicated lines 4—4 of Fig. 5.
Figure 5:
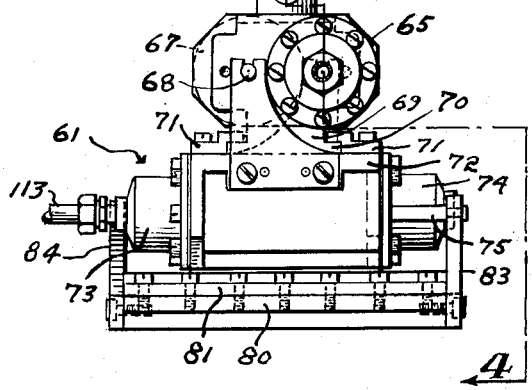
Fig. 5 is a front end view of the portions of the instrument shown in Fig. 4.

A control unit, generally indicated at 61, has an upwardly disposed stud 62, see Fig. 4, entrant of the lower part of the sleeve 46 and locked therein as by the lock pin 63. The control unit 61 has a member 64 connected to a first pair of pressure operated devices 65 and 66 and these are arranged side-by-side in a horizontal plane but with their respective piston rods parallel and extending in opposite directions. The piston rod of the device 65 is indicated at 67 while that of the device 66 is indicated at 68. The devices 65 and 66 are also attached to a plate 69 projecting laterally to provide shoulders 70 in parallel with the piston rods to slidably support gibs 71 attached to the member 72.

The plate 72 carries pressure responsive devices 73 and 74 in the same plane but with their piston rods 75 and 76 parallel with and extending in opposite directions and at right angles to the axis of the piston rods 67 and 68. The piston rods 67 and 68 are connected to the plate 72 by means of yokes 77 and 78, respectively.

Below the devices 73 and 74, there is a mounting plate member 80 for use in the support of the binocular magnifier 26. The plate 80 has gibs 81 engageable with the margin of the plate member 82 attached to the devices 73 and 74. To the ends of the plate 80, there are secured yokes 83 and 84 connecting the piston rods 75 and 76, respectively, thereto.

With general reference to the binocular magnifier 26, it is noted that it has its own light source 86 and a centrally located, vertical plate 87 slidably connected to a mount 88 and adapted to be locked thereto in any vertically selected position by means of the manually operated lock 89, conveniently of the cam type. The mount 88 is telescopically connected to the tubular member 90 provided with a locking device whose handle is shown at 91. At the upper end of the member 90 there is an arm 92 locked to the plate 80 when the adjusting screw 93, which also serves as a pivot, is suitably tightened.

In certain operations, such as that involving the division of a cornea into exterior and posterior corneal layers, proper illumination is of critical importance. For such purposes a so-called slit lamp is used and this is generally indicated at 95. Connected to the plate 87, as may be seen in Fig. 10, is supporting structure 96 arcuate with respect to the focal point of the magnifier 26 on which the lamp 95 is radially supported for movement therealong so that its beam always intersects the focal point at the selected angle.

While the pressure devices that are utilized may be of different types, those shown have proved to be reliable and effective in use. The devices 65, 66, 73 and 74 are identical and each is provided (see Fig. 4), with a cylinder receiving the head 97 on the piston rod of that device and sealed by the flexible diaphragm seal 98 locked between the cylinder establishing parts 99 and 100.

The pressure responsive device 60, except in size, is generally similar to the other pressure responsive devices in that its rod 59 carries a head 101 within the cylinder defined by the parts 102 and 103 which are clamped together to lock the margins of the flexible diaphragm seal 104 carried by the head 101.

It will be noted that there is an actuator, generally indicated at 105, shown, in Fig. 6, as located on the floor somewhat to the left of the central line of the support 30 and adapted to be operated by the left foot of the surgeon. The control unit 105 houses a pressure responsive device 106, see Fig. 7, generally similar to the device 60, and having its stem 107 engaged by the vertically guided nut 108 into which is threaded the stem of the circular plate 109 engageable by the surgeon's left foot and adapted to be turned thereby in one direction or the other to effect the raising and lowering of the stem 107. The pressure responsive device 106 has its cylinder in communication with the cylinder of the device 60 by means of a flexible conduit 110.

The cylinders of the devices 106 and 60 and the connecting conduit are filled with a suitable liquid. As a consequence, turning the head 109 in one direction moves the liquid column to advance the piston of the device 60, thereby rocking the bell crank lever 53 and raising the binocular magnifier 26 and the associated parts. It will be appreciated that when the plate 109 is turned in the opposite direction, the weight of the binocular magnifier 26 and that of the control unit, and of the associated parts, is sufficient to exert pressure on the piston rod of the device 60, forcing the body of liquid in the opposite direction to the permitted extent.

In general, the means employed to move the binocular magnifier 26 through a plane are similar in that each of the pressure responsive devices, 65, 66, 73 and 74, has its cylinder placed in communication with a cylinder of another pressure responsive device by flexible conduits 111, 112, 113 and 114, respectively. These conduits and the cylinders of the pressure responsive devices connected thereto are filled with a suitable liquid.

It will be noted from Figs. 1 and 6 that there is an actuator, generally indicated at 115, and positioned on the floor somewhat to the right of the center line of the support 30 and provided with actuating member 116 for engagement by the surgeon's right foot. The actuating member has a pivot 117 extending through a suitable opening in the cover 118 of the unit 115. The pivot 117 passes downwardly through the upper slide 119 slidably supported on horizontally disposed rods 120 clamped at one end as at 121 to the vertically disposed pivot 122. At their other ends, the rods 120 are interconnected by a frame 123 having supporting rolls 124 disposed to travel along the arcuate track 125 mounted on space brackets 126 and 127.

At the under surface of the slide 119, there is a plate 128 fast on the end of the pivot 117 and secured to the upper surface of the lower slide 129. The slide 129 is mounted on the rod 130 with one end clamped as at 131 to the vertically disposed pivot 132 and its other end is provided with a track engaging roll 133. The slide 129 is supported, for movement relative thereto, on a plate 134 rotatably mounted on centrally disposed support 135.

From the foregoing it will be appreciated that the member 116 may be moved by the surgeon's foot in any direction in a predetermined plane with either one or both of the vertically disposed pivots turning in response thereto. The pivot 122 is connected to a link 136 centrally thereof. Piston rods 137 and 138 are pivotally connected to opposite ends of the link 136 so that as the pivot 122 turns, the piston rods are moved equally but oppositely. The piston rods 137 and 138 are parts of pressure actuated devices 139 and 140, respectively, and these may be, and usually are, similar to the pressure operated devices of the control unit. The pressure operated device 139 has its cylinder placed in communication with the cylinder of the pressure responsive device 65 by the flexible conduit 111. The pressure operated device 140 is similarly connected to the pressure operated device 66 by the flexible conduit 112.

The vertically disposed pivot 132 is connected to a link 141 centrally thereof and connecting rods 142 and 143 are pivotally connected to the ends thereof so that as the pivot 132 is turned in either direction, the rods 142 and 143 are moved equally but oppositely. The piston rods 142 and 143 are parts of the pressure responsive devices 144 and 145, respectively, and these are similar to the companion devices 139 and 140 and have the interior of their cylinders placed in communication with the interior of the cylinders of the pressure responsive devices 73 and 74, respectively.

It will be appreciated that as the turning of the pivots 122, 132 is attended by equal but opposite movement of the plunger of the piston rods of the associated pressure operated devices, corresponding movements occur in the pressure operated devices at the other ends of the columns defined by the flexible conduits.

These movements result in the desired adjustment of the control unit 61 to bring the binocular magnifier 26 and the associated lamp exactly in position.

From the foregoing it will be apparent that the instrument makes it possible for the surgeon to move the binocular magnifier 26 by means of his feet quickly, easily and accurately, ensuring that the desired part of the field of the operation is always sharply in focus and properly illuminated.

What I therefore claim and desire to secure by Letters Patent is:

1. In an instrument for use by a surgeon in viewing, under magnification, the eye on which he is operating, a standard, a binocular magnifier, means connected to said standard and supporting said magnifier with its optical axis vertically disposed, said means including a vertically slidable connection, a flexible hydraulic column, and a pair of pressure operated devices at its ends of which one is operatively connected to said connection and the other of which is a control, said means also including a pair of members interconnected for movement relative to said connection and at right angles to each other in parallel, horizontal planes, a pair of hydraulic columns for each member, each column including a pressure operated device at each end, the devices at corresponding ends of each pair of columns being connected to opposite ends of a respective one of said members, and actuator means including a control member movable in any direction in a plane, the devices at the other ends of each pair of columns being connected to said control member for equal opposite movement in response to movements thereof, each pair of thus connected devices having maximum travel on movement of said control member in one predetermined direction and being unaffected by movement of said control member in a direction at right angles thereto.

2. In an instrument for use by a surgeon in viewing, under magnification, the eye on which he is operating, a standard, a binocular magnifier, means connected to said standard and supporting said magnifier with its optical axis vertically disposed, said means including a pair of pressure operated devices at its ends of which one is operatively connected to said connection and the other of which is a control, said means also including a pair of members interconnected for movement relative to said connection and at right angles to each other in parallel, horizontal planes, a pair of hydraulic columns for each member, each column including a pressure-operated device at each end, the devices at corresponding ends of each pair of columns being connected to opposite ends of a respective one of said members, and actuator means including a control member movable in any direction in a plane, the devices at the other ends of each pair of columns being connected to said control member for equal opposite movement in response to movements thereof, each pair of thus connected devices having maximum travel on movement of said control member in one predetermined direction and being unaffected by movement of said control member in a direction at right angles thereto.

3. In an instrument for use by a surgeon in viewing, under magnification, the eye on which he is operating, a standard, a binocular magnifier, means connected to said standard and supporting said magnifier with its optical axis vertically disposed, said means including a vertically slidable connection, a flexible hydraulic column, and a pair of pressure operated devices at its ends of which one is operatively connected to said connection and the other of which includes a threaded, rotatable control, said means also including a pair of members interconnected for movement relative to said connection and at right angles to each other in parallel, horizontal planes, a pair of hydraulic columns for each member, each column including a pressure operated device at each end, the devices at corresponding ends of each pair of columns being connected to opposite ends of a respective one of said members, and actuator means including a control member movable in any direction in a plane, the devices at the other ends of each pair of columns being connected to said control member for equal opposite movement in response to movements thereof, each pair of thus connected devices having maximum travel on movement of said control member in one predetermined direction and being unaffected by movement of said control member in a direction at right angles thereto.

4. In an instrument for use by a surgeon in viewing, under magnification, the eye on which he is operating, a standard, a binocular magnifier, means connected to said standard and supporting said magnifier with its optical axis vertically disposed, said means including a pair of pressure-operated devices at its ends of which one is operatively connected to said connection and the other of which is a control, said means also including a pair of members interconnected for movement relative to said connection and at right angles to each other in parallel, horizontal planes, a pair of hydraulic columns for each member, each column including a pressure-operated device at each end, the devices at corresponding ends of each pair of columns being connected to opposite ends of a respective one of said members, and actuator means including a pair of centrally pivoted links, one for each pair of columns, the devices at the other ends thereof each being connected to an end of the appropriate link, an arm for each link and operatively connected thereto, said arms crossing each other in vertically spaced, parallel relationship, and a control member slidably connected to said arms.

5. In an instrument for use by a surgeon in viewing, under magnification, the eye on which he is operating, a standard, a binocular magnifier, means connected to said standard and supporting said magnifier with its optical axis vertically disposed, said means including a pair of pressure operated devices at its ends of which one is operatively connected to said connection and the other of which is a control, said means also including a pair of members interconnected for movement relative to said connection and at right angles to each other in parallel, horizontal planes, a pair of hydraulic columns for each member, each column including a pressure operated device at each end, the devices at corresponding ends of each pair of columns being connected to opposite ends of a respective one of said members, and actuator means including a pair of centrally pivoted links, one for each pair of columns, the devices at the other ends thereof each being connected to an end of the appropriate link, an arm for each link and operatively connected thereto and including a roller, said arms crossing each other in vertically spaced relationship, a track for each roller, and a control member slidably connected to said arms.

References Cited in the file of this patent

UNITED STATES PATENTS 2,093,604     Gallasch     Sept. 21, 1937

(Other references on following page)

UNITED STATES PATENTS

| | | |
|---|---|---|
| 2,208,882 | Graff et al. | July 23, 1940 |
| 2,235,319 | Jobe | Mar. 18, 1941 |
| 2,285,987 | Krimsky | June 9, 1942 |
| 2,482,669 | Harding | Sept. 20, 1949 |
| 2,645,972 | Aitcheson | July 21, 1953 |
| 2,662,444 | Gradisar | Dec. 15, 1953 |
| 2,765,702 | Sachtleben | Oct. 9, 1957 |

OTHER REFERENCES

Trade publication by Bausch & Lomb, "Binocular Ophthalmoscope," Pamphlet H557, 15, V11–49 (1949), containing 4 pages.

Bausch & Lomb Stereoscopic Wide Field Microscopes, Catalog D–15, received in U.S. Patent Office, January 13, 1950, pages 15 and 17 relied upon.